April 16, 1935.  H. E. WARREN  1,998,297
SYNCHRONOUS MOTOR
Filed May 26, 1934

Inventor:
Henry E. Warren,
by Harry E. Dunham
His Attorney.

Patented Apr. 16, 1935

1,998,297

UNITED STATES PATENT OFFICE 1,998,297

SYNCHRONOUS MOTOR

Henry E. Warren, Ashland, Mass., assignor to Warren Telechron Company, a corporation of Maine Application May 26, 1934, Serial No. 727,749

2 Claims. (Cl. 172—275)

My invention relates to synchronous motors and its object is to provide an inexpensive form of low-speed synchronous motor suitable for driving clocks. The motor to be described is of the nonself-starting variety requiring means other than its synchronous motor features to bring it up to approximately synchronous speed. Such a motor is usually started by spinning the rotor by hand and the motor of my invention may be started in this way.

A simple form of motor according to my invention may consist of two axially-displaced motor sections, each consisting of a magnetic toothed rotor part and a bipolar stator field part which usually has teeth in the pole faces. The axially-displaced rotor parts are joined by an axial magnet core which may be a permanent magnet and the axially-displaced stator parts are extensions from a common core energized by a single-phase coil.

The spacing of the teeth in the rotor parts and in each main stator pole part are the same, but, due to a staggered relationship between the teeth in the stator and rotor parts to be hereinafter explained, the alternating flux of the stator takes a path of minimum reluctance through the rotor at synchronous speed which is in an axial direction and always in the same axial direction. Due to this relationship, the rotor becomes polarized in an axial direction and may, if desired, be permanently magnetized in such direction.

The synchronous speed of such a motor can be made most anything desired by varying the number of rotor teeth and by making corresponding changes in the stator. Other things being equal, the diameter of such a motor is about half that of earlier synchronous motors for the same synchronous speed.

Figure 1:
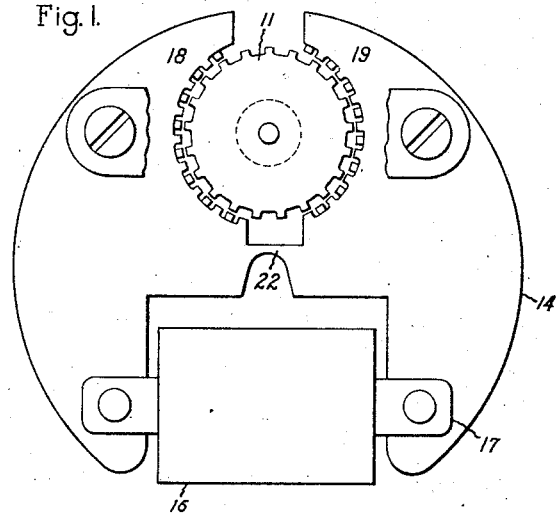
Figure 2:
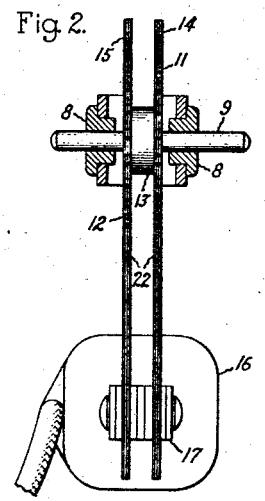
Figure 3:
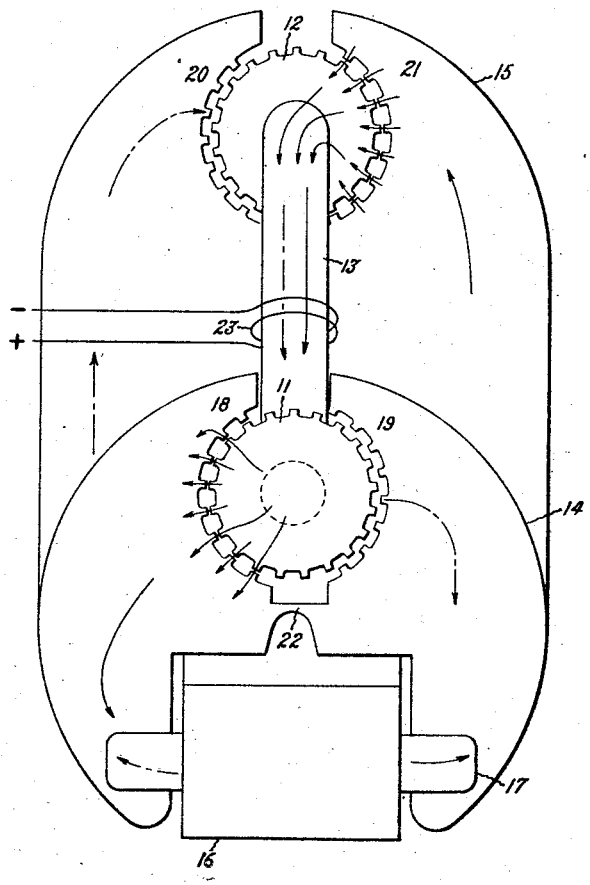
Figure 4:
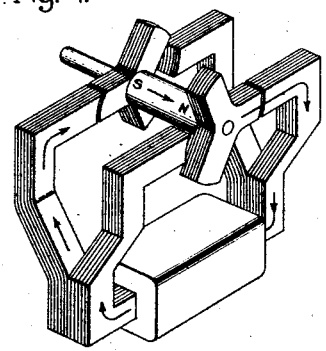

The features of my invention which are believed to be novel and patentable will be pointed out in the claims appended hereto. For a better understanding of my invention, reference is made in the following description to the accompanying drawing in which Fig. 1 represents an end view of a motor built in accordance with my invention; Fig. 2 is a partially sectioned side view of such a motor; Fig. 3 is a diagrammatic view of the motor arranged to illustrate the flux paths therethrough at synchronous speed; and Fig. 4 is a perspective view of a simple high-speed embodiment of the invention where the stator teeth are reduced to one per pole.

Referring particularly to Figs. 1 and 2, it will be noted that the rotor of the motor comprises a pair of axially-displaced discs 11 and 12 which have their central portions magnetically connected by an axial core part 13. These rotor parts may be made from hardened steel and the part 13 may be and usually is a permanent magnet polarized in an axial direction although this is not essential. It may be stated, however, that the rotor tends to become permanently magnetized in an axial direction, during synchronous operation in any event, because the flux therethrough is always in the same direction. The rotor discs have the same number of evenly-spaced teeth in their periphery. The number of such teeth will depend upon the synchronous speed desired and the dimensions and proportioning of such teeth should be such as to produce satisfactory synchronous torque in this type of motor. The rotor is mounted on a shaft 9 and supported in suitable bearings indicated at 8.

The stator of the motor consists of a pair of axially-spaced bipolar field elements 14 and 15 extending from a common core part 17 and energized from a common single-phase coil 16. The bipolar field elements are thus magnetically connected in parallel. The stator thus has four main pole pieces 18, 19, 20, and 21 (see Fig. 3). Pole pieces 18 and 20 are positive when pole pieces 19 and 21 are negative and vice versa. The polar portions of the stator of each field section are preferably joined by a thin portion 22 to strengthen the structure mechanically without shunting any material amount of flux from the pole pieces.

The pair of bipolar axially-spaced field members 14 and 15 substantially embrace and cooperate with the pair of axially-spaced rotor discs 11 and 12 and each of the stator pole pieces have teeth cut therein adjacent the rotor discs. The teeth in each stator pole piece are spaced the same as the teeth in the rotor but, as best shown in Fig. 3, the teeth in the different pole pieces are staggered in such a way that (considering the motor field to be energized) the teeth in one rotor disc 11 are opposite the teeth in the adjacent negative stator pole piece 18 and between the teeth in the adjacent positive stator pole piece 19 at the same time that the teeth in the other rotor disc 12 are opposite the teeth in the adjacent positive stator pole piece 21 and between the teeth in the adjacent negative stator pole piece 20 as represented in Fig. 3. At this instant then, the path of minimum reluctance for the stator flux through the rotor is from positive stator pole piece 21 into rotor disc 12, axially through the rotor core 13 to the other rotor disc 11, and out into negative stator pole piece 18. This flux path is indicated by the full-line arrows in Fig. 3. If now the rotor is running at a speed where its teeth move half their spacing in a half cycle, they will arrive at another minimum reluctance position in time to intercept the next flux pulsation which is in the opposite direction in the stator poles but which passes through the rotor in the same axial direction as before. This is because stator pole pieces 19 and 21 will then be negative, stator pole pieces 18 and 20 will be positive, and the rotor teeth are displaced one-half tooth pitch from the positions represented in Fig. 3 so that the path of the flux through the rotor will be from positive stator pole piece 20 into rotor disc 12, axially through rotor core 13 to rotor disc 11, and out to negative stator pole piece 19 as indicated in the dotted-dash line arrows in Fig. 3. The motor will thus have a definite synchronous speed where the rotor teeth move a half tooth pitch per half cycle or a full tooth pitch per cycle because at this speed the reluctance between stator and rotor pulsates between maximum and minimum values in synchronism with the flux pulsations. At such speed, all the stator flux pulsations of one sign pass through or utilize stator pole pieces 18 and 21 while all the stator flux pulsations of opposite sign utilize stator pole pieces 19 and 20. All the flux pulsations pass through the rotor in the same axial direction.

The reluctance between a rotor disc and its two adjacent stator pole pieces varies between the two pole pieces alternately with the flux alternations. For example, disc 12 receives a positive flux pulsation from pole piece 21 when the reluctance therebetween is a minimum and when the reluctance between this disc and stator pole 20 is a maximum. The next half cycle disc 12 receives a positive flux pulsation from stator pole 20 when the reluctance therebetween is a minimum and when the reluctance between disc 12 and pole piece 21 is a maximum.

From the above, it will be seen that there are two important distinctions between this form of motor and the ordinary nonself-starting synchronous motor of the reluctance type such as is described, for example, in United States Patent No. 1,924,853 to Hammond, August 29, 1933.

My motor runs one-half the speed of the ordinary reluctance motor for the same size of rotor disc and teeth because, in the ordinary reluctance motor, the teeth of the rotor move a complete tooth pitch during a half cycle instead of one-half tooth pitch. Relatively speaking, in this new motor, I have the same number of rotor teeth as in the ordinary reluctance motor for the same synchronous speed but here these teeth are on two discs of half the diameter of the single disc of the ordinary reluctance motor. The diametrical dimensions of the motor may thus be reduced by half to obtain the same synchronous speed as before by means of the present invention. As shown in Fig. 2, the axial dimensions of the motor can be made very small and the reduction in diameter is much more important than the slight increase in length in reducing the overall dimensions of the motor and arriving at a compact design.

The second important distinction of my motor over the usual nonself-starting reluctance motor is that the flux through the rotor is always in the same direction and, hence, can be made of hardened steel and become more or less permanently magnetized by the flux pulsations at synchronous speed, thereby increasing the synchronous pull-out torque, reducing the necessary stator excitation, and improving the power factor of the motor. In fact, the axial rotor core part 13 can be made a permanent magnet using a magnetic alloy of high retentivity that will retain its permanent magnetism although of very short dimensions in the direction of its polarization. To the extent that the rotor is or becomes permanently magnetized, the result is analogous to that obtained where direct current excitation is employed in large synchronous motors. This polarization or remnant magnetism in the rotor is beneficial because the pure reluctance torque is supplemented by torque due to the attraction and repulsion effect of unlike and like magnetic poles.

If the rotor core is not initially permanently magnetized, the rotor will, when intially synchronized, pull into step as a reluctance motor without regard to the axial direction of the flux therethrough. However, after being permanently magnetized either initially or by previous synchronous operation, it will always synchronize in accordance with the polarity of the remnant magnetism in the rotor.

The motor as shown in the drawing is provided with twenty-one teeth in each of its rotor discs. Such a rotor will, therefore, make a complete revolution in twenty-one cycles at the basic synchronous speed and on a 60 cycle excitation will have a basic synchronous speed of $171\frac{3}{7}$ revolutions per minute. If the rotor has twenty teeth, its synchronous speed will be 180 revolutions per minute on 60 cycles. With twenty-two rotor teeth, the synchronous speed will be $163\frac{7}{11}$ revolutions per minute on 60 cycles. Thus another advantage of this motor is that we are now able to obtain a variety of synchronous speeds not heretofore obtainable in a very economical and simple manner. Also, we are able to obtain synchronous speeds with a polarized rotor corresponding to various odd numbers of poles which, so far as I am aware, has never before been accomplished.

As the number of rotor teeth are reduced, the number of stator teeth should be reduced to the extent necessary to maintain a properly proportioned motor. For example, with a rotor having only three salient poles in each disc, the number of teeth in each stator pole would be reduced to one resulting in a simple bipolar salient pole structure at the two ends of the rotor. The synchronous speed would be 600 revolutions per minute on 60 cycles. Such a construction is represented in outline in Fig. 4 and perhaps represents the simplest embodiment of the invention and also the highest speed for which the invention is practicable. In all cases, the stator has substantially the simplicity of an ordinary single-phase bipolar structure.

Owing to the ability of obtaining odd synchronous speeds in a simple manner, it may be desirable in some cases to manufacture this motor in larger sizes than is at present contemplated. In such instances, it may be desirable to excite the rotor with a direct current winding. This may be done in a very simple manner as I have indicated in Fig. 3 where 23 represents a stationary direct current exciting coil surrounding the rotating axial core 13.

What I claim as new and desire to secure by Letters Patent of the United States, is:

1. An alternating-current synchronous motor comprising stator and rotor members, the stator member comprising two parallel plates, each plate being substantially magnetically and symmetrically divided into two parts and the magnetically divided parts of both plates being joined by a common magnetic core piece, a single-phase energizing winding on said core piece whereby opposite polarity fluxes may be simultaneously produced in the magnetically divided portions of each plate, the magnetically divided portions of each plate approaching each other at a point removed from the core so as to form with said core a pair of bipolar field structures, the rotor for said motor comprising two parallel magnetic discs mounted for rotation as a unit on a common axis, said discs being respectively in the planes of said parallel stator plates and interposed between the bipolar portions thereof, the central portions of said discs being magnetically connected together, the bipolar portions of each stator plate having a plurality of evenly spaced teeth facing the rotor discs and the rotor discs having a plurality of similarly spaced teeth facing the stator teeth, the teeth in the different bipolar portions of the stator being sufficiently staggered with respect to each other that, when the single-phase stator coil is energized, the alternating stator fluxes find paths of minimum reluctance through the rotor always in the same axial direction from one disc to the other at a speed where the rotor turns the distance equal to the spacing between its teeth per flux cycle.

2. An alternating-current synchronous motor comprising stator and rotor members, the stator member comprising two parallel plates, each plate being substantially magnetically and symmetrically divided into two parts and the magnetically divided parts of both plates being joined by a common magnetic core piece, a single-phase energizing winding on said core piece whereby opposite polarity fluxes may be simultaneously produced in the magnetically divided portions of each plate, the magnetically divided portions of each plate approaching each other at a point removed from the core so as to form with said core a pair of bipolar field structures, the rotor for said motor comprising two parallel magnetic discs mounted for rotation as a unit on a common axis, said disc being respectively in the planes of said parallel stator plates and interposed between the bipolar portions thereof, the central portions of said discs being joined by an axially disposed permanent magnet, the bipolar portions of each stator plate having a plurality of evenly spaced teeth facing the rotor discs and the rotor discs having a plurality of similarly spaced teeth facing the stator teeth, the teeth in the different bipolar portions of the stator being sufficiently staggered with respect to each other that, when the single-phase stator coil is energized, the alternating stator fluxes find paths of minimum reluctance through the rotor always in the same axial direction from one disc to the other at a speed where the rotor turns the distance equal to the spacing between its teeth per flux cycle.

HENRY E. WARREN.